United States Patent
Williams (10) Patent No.: US 7,200,763 B2
(45) Date of Patent: Apr. 3, 2007

(54) METHOD AND APPARATUS FOR CONTROLLING THE POWER CONSUMPTION OF A SEMICONDUCTOR DEVICE

(75) Inventor: Emrys J. Williams, Milton Keynes (GB)

(73) Assignee: Sun Microsystems, Inc., Santa Clara, CA (US)

( * ) Notice: Subject to any disclaimer, the term of this patent is extended or adjusted under 35 U.S.C. 154(b) by 570 days.

(21) Appl. No.: 10/682,758

(22) Filed: Oct. 9, 2003

(65) Prior Publication Data

US 2005/0081073 A1 Apr. 14, 2005

(51) Int. Cl.
- G06F 1/26 (2006.01)
- G06F 1/28 (2006.01)
- G06F 1/30 (2006.01)
- G06F 1/32 (2006.01)

(52) U.S. Cl. .................. 713/320; 713/300; 713/322; 713/323

(58) Field of Classification Search ............... None
See application file for complete search history.

(56) References Cited

U.S. PATENT DOCUMENTS

| | | | |
|---|---|---|---|
| 4,272,717 A | 6/1981 | Baily | |
| 4,933,829 A | 6/1990 | White | |
| 5,584,031 A | 12/1996 | Burch et al. | |
| 5,825,674 A | 10/1998 | Jackson | |
| 6,157,008 A | 12/2000 | Brown et al. | |
| 6,205,555 B1 * | 3/2001 | Kageshima et al. | 713/300 |
| 6,367,023 B2 * | 4/2002 | Kling et al. | 713/340 |
| 6,463,396 B1 | 10/2002 | Nishigaki | |
| 6,704,876 B1 * | 3/2004 | Iacobovici et al. | 713/300 |
| 6,775,787 B2 * | 8/2004 | Greene | 713/340 |

(Continued)

FOREIGN PATENT DOCUMENTS

GB 2 260 233 4/1993

(Continued)

OTHER PUBLICATIONS

H.D.L. Hollmann, et al., "Protection of Software Algorithms Executed on Secure Modules," Future Generation Computer Systems 13, Elsevier Science B. V., 1997, pp. 55-63.

(Continued)

Primary Examiner—James K. Trujillo
(74) Attorney, Agent, or Firm—Robert C. Kowert; Meyertons, Hood, Kivlin, Kowert & Goetzel, P.C.

(57) ABSTRACT

A method and apparatus are provided for controlling the power consumption of a semiconductor device such as a CPU or other form of processor that is operable to process a sequence of instructions. The device includes a monitor for checking the power consumption of the device, in order to detect any significant change in power consumption (which can cause problems for the power supply circuitry). In order to mitigate such change, one or more dummy instructions are inserted into the sequence of instructions. The dummy instructions do not affect the logical processing, but are selected in order to limit the change in power consumption. Thus if the change in power consumption represents an increase, then dummy instructions are selected that do not require much current. Conversely, if the change in power consumption represents a decrease, then dummy instructions are selected that draw a relatively large amount of current.

30 Claims, 7 Drawing Sheets

U.S. PATENT DOCUMENTS

| | | |
|---|---|---|
| 2001/0003207 A1 | 6/2001 | Kling et al. |
| 2004/0181698 A1 | 9/2004 | Williams et al. |

FOREIGN PATENT DOCUMENTS

| | | |
|---|---|---|
| GB | 2 361 326 | 10/2001 |
| JP | 2000330673 | 11/2000 |
| JP | 2001034370 | 2/2001 |
| WO | 92/10032 | 6/1992 |
| WO | 98/38734 | 9/1998 |

OTHER PUBLICATIONS

Combined Search and Examination Report under Sectios 17 and 18(3), Application No. GB0415878.8, mailed Nov. 18, 2004, 5 pages.

* cited by examiner

METHOD AND APPARATUS FOR CONTROLLING THE POWER CONSUMPTION OF A SEMICONDUCTOR DEVICE

FIELD OF THE INVENTION

The present invention relates to semiconductor devices such as processors, and more particularly to controlling the power consumption of such devices.

BACKGROUND OF THE INVENTION

Figure 1:
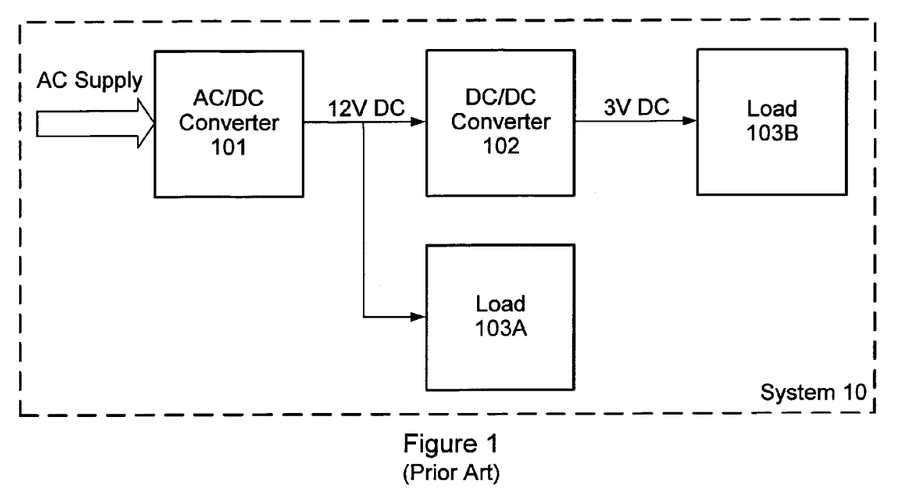
FIG. 1 is a high-level schematic representation of a power supply configuration in a typical computer system.

FIG. 1 provides a schematic representation of the power supply arrangement in a typical computing device 10. The system receives AC power supply from the mains or other appropriate source. The AC supply is fed into an AC/DC converter 101, which outputs a DC power supply at some intermediate voltage (e.g. 12 Volts). This output is then supplied directly to some of the components within system 10, as illustrated schematically by load 103A in FIG. 1. Typically load 103A comprises various electromechanical devices, such as disk drives, fans, and so on.

System 10 further includes components, depicted schematically in FIG. 1 as load 103B, which require a lower DC voltage than load 103A. Accordingly, system 10 also incorporates a DC/DC converter 102 that converts the 12-Volt output from AC/DC converter 101 to a relatively low voltage DC supply (e.g. 3 Volts). Typically DC/DC converter 102 is located on the motherboard of system 10, and supplies its low voltage output to various digital electronic components on the motherboard, such as a central processing unit (CPU) and dynamic random access memory (DRAM).

It will be appreciated that there are many other known configurations for the power supply within a computing system apart from that shown in FIG. 1. For example, there may be several DC/DC converters 102 in order to provide different voltages for various devices (or alternatively a single converter may support multiple outputs at a range of voltages).

One problem in the design of power supplies for computers is that there can be significant fluctuations in the amount of power that certain components require. This is particularly a problem in relation to digital electronic devices, such as CPUs and other similar forms of logic devices. These components operate at very high speeds (clock rates in excess of 1 GHz are common now), and their power consumption can vary over a very short timescale dependent upon the particular instructions being executed. The system power supply configuration, such as DC/DC converter 102 in FIG. 1, therefore needs to be able to accommodate significant variations in power usage.

Figure 2:
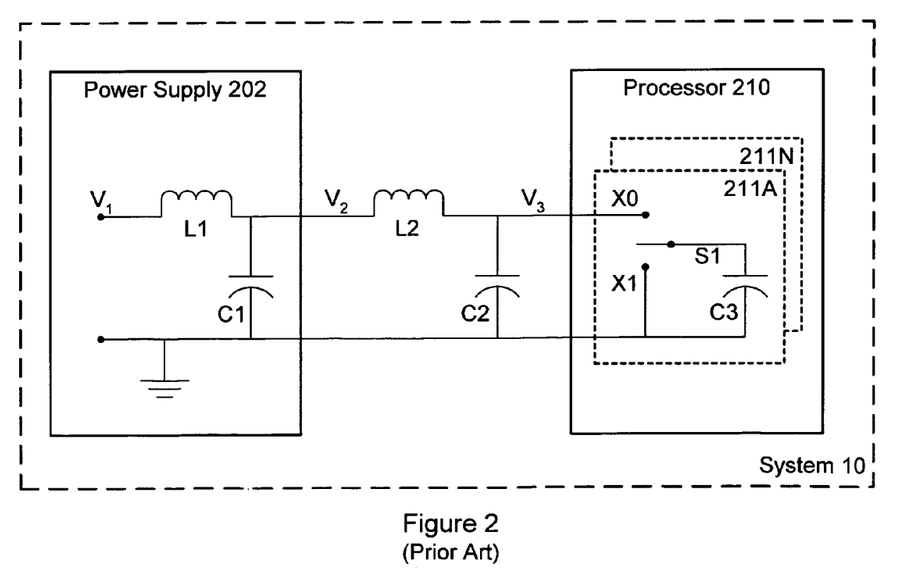
FIG. 2 is schematic representation showing in more detail the power supply to a processor in a typical computer system.

This problem is illustrated in more detail in FIG. 2, which depicts in schematic form the supply of power from power supply 202 to a processor 210. In a computer system, power supply 202 is typically of the switching regulator kind, and incorporates an inductor L1 and a capacitor C1. The design and operation of such power supplies is well-known in the art (see, for example, "The Art of Electronics", by P Horowitz and W Hill, Cambridge University Press, 1989, ISBN 0-512-37095-7, especially Chapter 6), and so will not be described further. Note that the power supply 202 may correspond to AC/DC converter 101 or to DC/DC converter 102 from FIG. 1. The supply path from power supply 202 through to processor 210 incorporates inductance L2. This primarily arises from various circuit wiring and so on, and is therefore very difficult to eliminate.

As shown in FIG. 2, power supply 202 receives an input of voltage level $V_1$, and outputs a voltage of $V_2$, which is then modified to $V_3$ after passing through inductance L2 (with $V_0$ corresponding to ground). It is important that $V_2$ and $V_3$ are maintained at a constant (rated) level. One reason for this is that power supply 202 typically supplies power to other devices (not shown in FIG. 2), apart from processor 202, so that if $V_2$ and $V_3$ wander from their rated level, then these other devices do not receive their expected voltage.

More particularly, power supply is typically designed with capacitor C1 to hold $V_2$ steady. However, if a device is placed in effect in parallel with processor 210, then it will actually see voltage $V_3$ (i.e. voltage $V_2$ as modified by inductance L2). In general therefore, voltage $V_3$ must be maintained as close as possible to voltage $V_2$, in order to remain within specifications for the various devices in system 10. If the received voltage, $V_3$, suffers an excursion such that it goes outside these specifications, then proper operational behaviour of system 10 can no longer be assured.

The electrical behaviour of processor 210 can be modelled in simplified fashion by the configuration in block 211A, comprising a capacitor, C3, and a switch, S1. For each operational cycle of processor 210, switch S1 is set to position X0 or X1, according to the particular operation to be performed. In the switch setting X0, the capacitor C3 charges up, until it is saturated, at which point no further charge is drawn. Alternatively, with switch S1 set to position X1, capacitor C3 discharges, until no charge is left. (It is assumed that the time taken for capacitor C3 to charge or discharge corresponds approximately to one operational cycle of processor 210).

The current flow through block 211A therefore depends upon the particular sequence of settings for switch S1, which in turn depends upon the sequence of instructions being executed by the processor. If switch S1 is rapidly alternated between position X0 and position X1, then capacitor C3 repeatedly charges up and discharges. This will cause block 211A to draw a relatively high current from power supply 202. Alternatively, if switch S1 is maintained for multiple operations in a fixed position, whether X0 or X1, then the current drawn by block 211A is relatively small (and indeed falls towards zero).

A more accurate representation of the electrical behaviour of processor 210 has multiple blocks 211, each analogous to block 211A, and all in parallel with one another. (The presence of these multiple blocks is indicated schematically in FIG. 2 by additional block 211N). The switch settings of these additional blocks are likewise dependent on the particular instructions being performed by processor 210, although the dependency will generally vary from one block to another. For example, a certain operation may set switch S1 to setting X0 in some of the blocks and to setting X1 in the remainder of the blocks.

The total current drawn by the processor 210 corresponds to the sum of the separate currents drawn by each of the individual blocks 211A, 211N. The setting of the switch within each block depends upon the instructions being processed. In general it is expected that some blocks will draw current while others do not. However, it is possible that a particular instruction sequence causes the switches in all (or most) of the blocks to alternate between position X0 and position X1. This will then lead to very high current being drawn by processor 210. Conversely, if the instruction sequence leaves the switch setting unchanged for multiple operations in most or all of the blocks, then a very small amount of current will be drawn. These circumstances will lead to a sharp rise or fall in the current taken by processor 210.

One particular situation in which the current taken by the processor 210 can change suddenly is due to the presence of processor idle time. Thus CPUs rarely operate at 100% capacity, but rather have to wait at times to perform the next instruction. This waiting can arise for various reasons, for example, there may be a delay while the CPU obtains data from a hard disk, or the CPU may be waiting for a user to enter a command to proceed. Since the CPU state does not alter during such idle time, no current is drawn. Consequently, the onset of idle time generally leads to a sudden fall in the current taken by the processor; conversely, the end of idle time (i.e. restarting normal instruction execution) will typically cause a sharp rise in the current taken by the processor.

Unfortunately, such sudden changes in processor current consumption can cause a problem in view of inductance L2 (which is difficult to eliminate, as previously explained). Thus the voltage across inductance L2 varies in proportion to dI/dt, where I is the current through L2. If the current drawn by processor 210 fluctuates rapidly, whether quickly rising or falling, then this will potentially cause $V_3$ to depart significantly from $V_2$. Typically a sudden rise in current consumption will cause $V_3$ to fall, whereas a sudden drop in current consumption will lead to a rise in $V_3$. These changes in the power supply network may cause severe operational difficulties for system 10.

One way to address this problem is by inserting capacitor C2, as shown in FIG. 2, and by making this as large as possible. This then allows variations in current through processor 210 to be satisfied by capacitor C2, rather than by altering the current flow though inductor L2. This reduces dI/dt across L2, and so helps to ensure that $V_3$ is maintained in conformity with $V_2$. However, due to the highly compact nature of modern semiconductor devices, it is difficult for capacitor C2 to have sufficiently big physical dimensions to provide the requisite degree of smoothing. Thus capacitor C2 is generally rather small, and so is unable to fully damp out the variations in current drawn by processor 210. Accordingly, the problem of undesirable voltage swings across inductance L2 remains.

In view of these circumstances, power supply circuits in modern computer systems for providing power to digital logic devices such as processor 210 have to be very carefully designed. In particular, any voltage fluctuations on the supply lines have to be minimised (such as by reducing L2 as much as possible), and the various devices attached to the supply lines then have to be robust enough to accommodate any residual voltage fluctuations. It will be appreciated that this places significant design constraints on the system, and generally adds to overall costs.

Note also that computer systems are typically available in a very wide range of configurations, for example, models in a given product range may vary in terms of processor speed, memory capacity, storage capacity, and so on, and may also evolve over time, as new components (e.g. higher speed processors) become available. In addition, customers frequently perform upgrades to installed systems as well, such as by supplementing or replacing existing components with new and more powerful components that were not necessarily available when the system was originally designed and purchased.

As a result, any given system is typically available in, or may be modified to, a very wide range of configurations. It is difficult for a manufacturer to rigorously test every single potential configuration. Instead, particular components (e.g. processors) are generally designed to be compatible (i.e. interchangeable) with one another, so that a modification or upgrade of such a component should not take a system outside its proper operating regime, including in terms of the power supply requirements. Nevertheless, there may be some subtle and unexpected differences in the way that slightly different versions of a component perform or interact with other components that do impact power consumption. This in turn might adversely affect system operation and reliability for certain particular configurations.

SUMMARY OF THE INVENTION

In accordance with one embodiment of the invention, there is provided a method of controlling the power consumption of a semiconductor device that is operable to process a sequence of instructions. The method involves monitoring the power consumption of the device and detecting any significant change. Responsive to the detection of such a change, one or more dummy instructions are inserted into the sequence of instructions. The dummy instructions are selected in order to smooth or to limit the change in power consumption of the device. In this manner, the power consumption by the semiconductor device can be regarded as self-regulating. This then helps to avoid disturbances on the voltage supply lines to the semiconductor device, where such disturbances might otherwise cause problems for additional devices on those lines. Typically this therefore allows the additional devices to be formed to less stringent specifications, and hence at reduced cost.

In general, instructions that consume relatively little power are inserted into the instruction sequence if the significant change in the power consumption of the device represents a rise in power consumption. Conversely, instructions that consume relatively high power are inserted if the significant change in the power consumption of the device represents a fall in power consumption. This therefore has the effect of mitigating what would otherwise be the relatively sudden change in power consumption, and tends instead to spread or smooth the change out over a longer time period.

Note that inserting one or more dummy instructions does not imply that the original instruction is lost. Rather, the original instructions can be buffered or otherwise maintained, ready for resumption when the dummy instructions have been executed, and no further dummy instructions are required. In this way, the overall processing results of the instructions are not affected by the insertion of the dummy instruction(s), apart from a possible slight delay. However, any such delay is unlikely to be significant, assuming that the proportion of dummy instructions is small.

There are various ways in which the power consumption of the device can be monitored. In one embodiment, the sequence of instructions is received and the power consumption of the device for each instruction is then estimated. One way of doing this is to access a look-up table to find a predicted power consumption for the instruction concerned. In another embodiment, a state model of the device is maintained. The state is then updated from a previous state to a new state in accordance with the instruction to be processed, with the predicted power consumption being determined from the previous state and the new state of the device.

Note that the estimated or predicted power consumption does not always have to be exactly correct, as long as overall it provides a reasonable approximation to ongoing power consumption. One reason for this is that if changes in power consumption occur on short timescales, intermediate timescales, and long timescales, then it is power consumption changes on intermediate timescales that are most significant for present purposes. For example, the detection of a significant change in the power consumption of the device may be performed over a timescale of N instruction cycles, such as by determining a difference between the power consumption over a current set of N instruction cycles and the power consumption over a preceding set of N instruction cycles (with a significant change then being detected if this difference exceeds a predetermined threshold).

This focus on intermediate timescales arises because there is typically a smoothing capacitor across a power input to the device that is able to absorb fluctuations on a short timescale. If C is this capacitance, V the normal operating voltage of the device, T the duration of a single instruction cycle, and I the maximum current that can be supplied to the device, then an appropriate value for N is approximately N=VC/IT. Thus the capacitor can absorb variations in power consumption over a smaller timescale than N cycles, but may not be able to do so over a longer timescale.

On the other hand, fluctuations in power consumption over much longer timescales are generally not so problematic. This is mainly because they do not react with any stray inductance to cause unwanted voltage excursions. For example, if the stray inductance is L, then variations on a timescale T>>IL/V (where I and V are as above) represent only relatively minor fluctuations in the voltage supply network, and so can normally be accommodated without too many problems.

The detection of a change in the power consumption can be made in respect of the estimated power consumption itself, or by using any other appropriate physical parameter related to or derived from the power consumption. Thus in one embodiment, the device is provided with a model of the power supply network for the device (typically this is in the form of a logical filter network, representing the various inductances, capacitances, and so on illustrated in FIG. 2). For a given power or current consumption by the processor, the model then predicts the impact of this on the voltage in the supply network (e.g. the variation in $V_3$ in FIG. 2). If it is predicted that this voltage will go outside (or perhaps close to) specified operating limits for the power supply network and associated components, then dummy instructions are inserted to mitigate such voltage excursions. It will be appreciated that utilising a physical model of the power supply network in this manner provides a more rigorous and reliable detection of problematic voltage fluctuations than simply looking at the power consumption time sequence per se (although it does require the various circuit parameters of the supply network to be available).

Note that one common reason for a sudden drop in power consumption is where the processor goes into idle mode, which typically occurs if the processor has to wait for an instruction and/or data to process. This sudden drop may cause dummy instructions that consume power to be inserted into the instruction queue. Since the instruction queue is empty (or halted) at this point, given that the processor is idling, such insertion of dummy instructions does not cause any delay in useful processing.

The injection of dummy instructions that consume power can therefore be regarded as more favourable than the injection of dummy instructions that do not consume any power, since the former will frequently occur during idle periods. (In contrast, a dummy instruction that does not consume power is utilised when there is a sudden rise in power consumption, which cannot be at the onset of processor idling). Consequently, to improve efficiency, the system can be configured so that an instruction is more likely to be inserted following a sudden fall in power consumption than following a sudden rise in power consumption.

One way of achieving this asymmetry is to set a nominal voltage for the device that is off-centre from the specified operating voltage range of the system. Thus the nominal voltage range represents the default, steady state voltage that is experienced by the device, assuming that the processor draws a steady current. Changes in processor power consumption then cause the actual voltage to depart from its nominal value. The actual voltage can be estimated using the network model described above to ensure that it remains within the specified operating voltage range, otherwise one or more dummy instructions are inserted.

If the nominal voltage is arranged to be closer to the top of the acceptable operating voltage range than to the bottom of this range, then a sudden fall in power consumption (leading to a rise in voltage) is more likely to take the voltage outside the acceptable range than a sudden rise in power consumption (which would lead to a fall in voltage). Therefore, the leeway or margin for accommodating a sudden rise in power consumption without having to insert dummy instructions (that would cause a processing delay) is increased. Conversely, the margin for accommodating a sudden fall in power consumption is reduced. However, since such a sudden fall in power consumption may well be due to the processor going into idle mode, when dummy instructions can be inserted without any performance penalty, this bias or asymmetry helps to improve overall efficiency and processing throughput.

In accordance with another embodiment of the invention, there is provided a semiconductor device comprising: a queue operable to hold a sequence of instructions; a monitor operable to estimate power consumption of the device; a detector operable to flag a significant change in the estimated power consumption of the device; and a multiplexer. A first input of the multiplexer is connected to the queue, a second input of the multiplexer is connected to one or more stored dummy instructions, and a control input of the multiplexer is connected to the detector. In this way, should a significant change in estimated power consumption be detected, the output of the multiplexer can be switched to an appropriate dummy instruction, in order to obviate or at least mitigate such change.

In accordance with another embodiment of the invention, there is provided a semiconductor device operable to process a sequence of instructions, comprising: a monitor operable to estimate power consumption of the device; a detector operable to flag a significant change in the estimated power consumption of the device; and a set of one or more dummy instructions for injection into the sequence of instructions in response to detecting a significant change in the estimated power consumption. The one or more dummy instructions are selected in order to reduce or to limit the change in power consumption.

In accordance with another embodiment of the invention, there is provided a power supply unit, a semiconductor device operable to process a sequence of instructions, and a power supply line from the power supply unit to the semiconductor device incorporating at least some inductance. The semiconductor device is operable to process one or more dummy instructions if the sequence of instructions for processing would otherwise require a significant change in current passing through the inductance.

The power regulation facility described herein is particularly useful in conjunction with digital electronic semiconductor load devices, especially those liable to occasional peaks in power consumption, such as a CPU and a DRAM. These are typically located in a computer system, which will therefore benefit from this facility. Nevertheless, the approach is potentially applicable to a wide range of other electronic systems, including telecommunication apparatus, household electronic goods (televisions, DVD players, etc.), and so on.

It will be appreciated that such system embodiments can generally utilise the same particular features as described above in relation to the method embodiments.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 3:
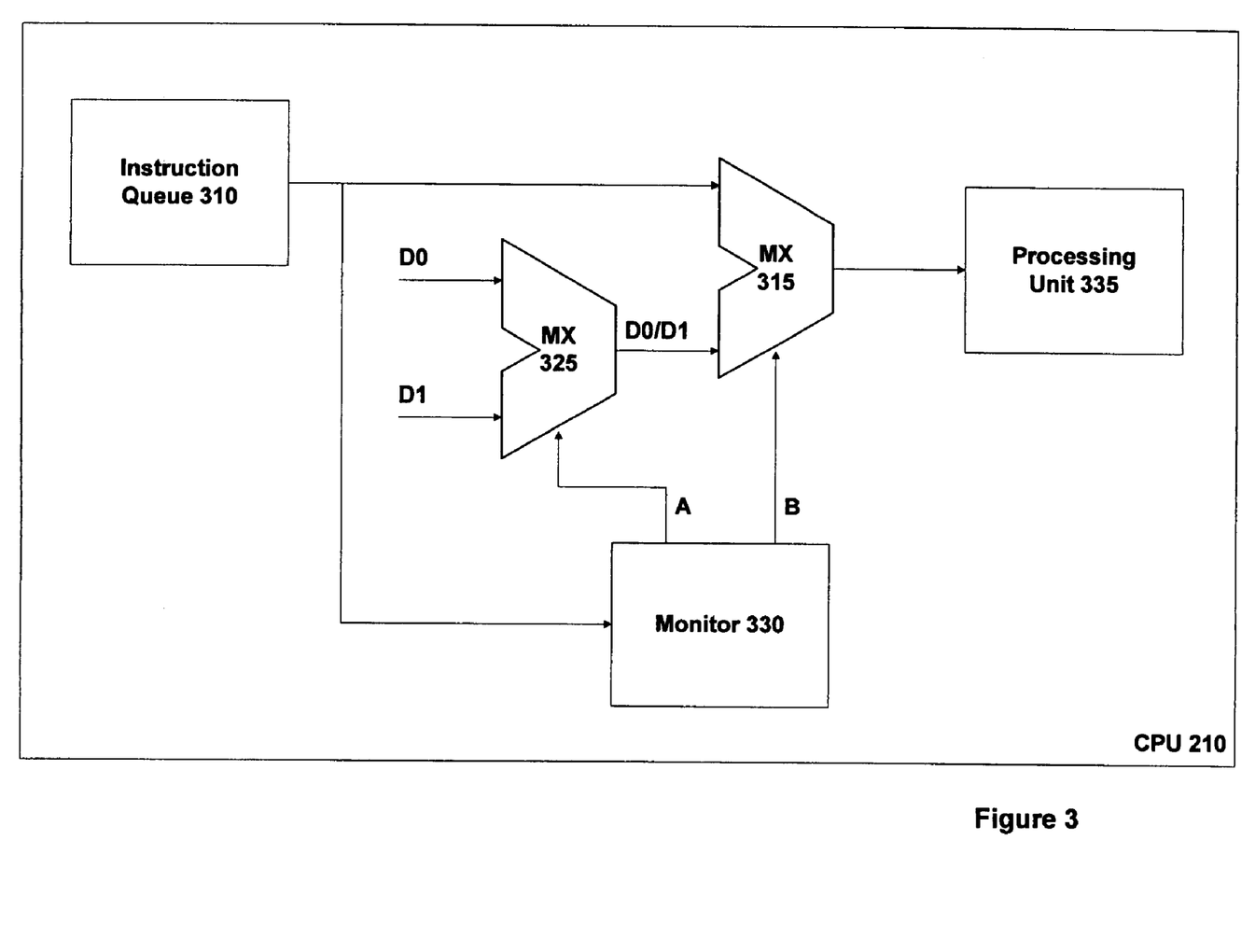
FIG. 3 is a schematic representation of a processor incorporating a power monitoring facility in accordance with one embodiment of the invention.

FIG. 3 illustrates a CPU 210 in accordance with one embodiment of the present invention. CPU 210 can typically be incorporated into system 10, such as shown in FIG. 1 or FIG. 2. Note that FIG. 3 only shows those components relevant to an understanding of power supply regulation in CPU 210, since the skilled person is already very familiar with the various other components in a typical CPU.

Instructions for execution by CPU 210 are received into instruction queue 310, where they are stored pending supply to the processing unit 335. The processing unit is responsible for actual execution of the instructions. If the processor is idling, the instruction queue may be temporarily halted or empty (the latter case can be regarded as having a sequence of null instructions in the instruction queue).

Also connected to the output of instruction queue 310 is a monitor 330, while interposed between the instruction queue 310 and processing unit 335 is a multiplexer 315. Thus instructions output from queue 310 pass firstly to processing unit 335 via multiplexer 315, and secondly to monitor 330.

CPU 210 also includes a second multiplexer 325. The output of this second multiplexer passes to the second input of multiplexer 315 (the first input of multiplexer 315 being from instruction queue 310). Monitor 330 controls which of these two inputs is passed by multiplexer 315 to processing unit 335 (as shown schematically in FIG. 3 by arrow B).

Connected to the two inputs of multiplexer 325 are dummy instructions D0 and D1 respectively. Monitor 330 controls which of these two inputs is passed to multiplexer 315 (as shown schematically in FIG. 3 by arrow A). D0 and D1 are dummy (or void) instructions in the sense that when executed by processing unit 335 they occupy one cycle of processing time, but otherwise leave processing unit 335 in an unaltered state. Thus the insertion of dummy instruction D0 or D1 into an instruction sequence is transparent as far as the logical operations of the processor 210 are concerned. The difference between dummy instruction D0 and dummy instruction D1 relates to their power consumption. In particular instruction D0 is arranged to draw as little current as possible through processing unit 335, while in contrast instruction D1 is arranged to draw as much current as possible. (Dummy instruction D0 is therefore analogous to placing the processor in idle mode, as if there were no instructions to process, and may be implemented in the same manner).

In operation, monitor 330 examines the instructions it receives from instruction queue 310 in order to assess the electrical current requirements of processing unit 335 (and hence CPU 210). In particular, monitor detects any sharp rise or fall in consumption. As long as no significant change is detected, then monitor 330 sets control signal B to multiplexer 315 so as to allow instructions from instruction queue 310 to pass through to processing unit 335. This can be regarded as the default or normal state of CPU 210.

However, if monitor 330 detects that the instruction sequence from queue 310 would cause a significant change in the power consumption of CPU 210, then it asserts signal B. This then changes the setting of the multiplexer 315, so that rather than outputting an instruction from queue 310 to the processing unit 335, it outputs a dummy instruction, D0 or D1 instead. Note that in these circumstances the instruction from queue 310 is not lost, but rather remains buffered within instruction queue 310. Then, when control signal B is subsequently released, the flow of instructions from queue 310 to processing unit 335 is resumed at this point. Consequently, the insertion of the dummy instruction(s) does not impact the overall processing flow (apart from any slight delay).

As previously stated, monitor 330 is also responsible for controlling multiplexer 325 (via Arrow A). This therefore allows monitor 330 not only to decide whether to insert a dummy instruction, but also to select which particular dummy instruction—D0 or D1—is to be inserted. Monitor 330 is configured so that if a sudden rise in the power consumption of CPU 210 is detected, then multiplexer A is controlled to pass instruction D0. In contrast, if a sudden fall in power consumption by CPU 210 is detected, then multiplexer A is controlled to pass instruction D1.

The use of dummy instructions D0 and D1 in this manner allows monitor 330 to mitigate or smooth fluctuations in the current drawn by CPU 210. This is done primarily with the aim of reducing current variations through inductance L2 (see FIG. 2), in order to maintain the supply voltage within specifications.

Note that the problems caused by inductance L2 are particularly acute for current variations through processor 210 on a timescale of approximately N processor instructions (where the precise value of N depends on the parameters of the particular circuits involved). Thus fluctuations on a timescale much less than N, i.e. typically one or two processor cycles, can be accommodated by capacitor C2, since the total charge involved is relatively small. Consequently, these do not cause current variations through the inductor L2, and hence should not lead to voltage problems. Conversely, fluctuations on timescales much longer than N have (in effect) a large denominator in dI/dt, and hence the voltage excursions across inductance L2 are again relatively small. In contrast, for fluctuations on intermediate timescales (corresponding approximately to N processor cycles), the charge involved may exceed the damping capacity of capacitor C2, while the timing is still sufficiently short to induce potentially significant voltage variations across inductor L2.

Table 1 provides an illustration of the principle of operation of the embodiment of FIG. 3. Thus it is assumed that there is a sequence of instructions to be processed, and the first row of Table 1 represents the power consumption associated with each of these instructions in turn. For example, the first instruction involves a power consumption of 0, the second instruction involves a power consumption of 1, the third instruction involves a power consumption of 0, and so on. (For simplicity, the power consumption of an instruction is regarded for the time being as either 0 or 1, analogous to the model of FIG. 2).

It will also be assumed that the system is particularly sensitive to variations in power consumption on a timescale of approximately N=4 processor cycles. In the second row of Table 1 therefore, the instructions of the first row are grouped into blocks of four instructions, and the total power consumption associated with each block of four instructions is specified. Thus the first block of four instructions consumes 1 unit of power, the next block of four instructions consumes 3 units of power, and so on.

We now assume that monitor 330 is designed to impose a constraint that the power consumption should not vary by more than 1 unit between adjacent blocks of 4 instructions. It will be appreciated that this helps to ensure that the current drawn through the supply inductance (such as L2 in FIG. 2) is relatively constant, at least over a timescale of N instructions. More particularly, any larger variations in current consumption are spread out over a longer period, and so should not lead to problematic voltage excursions across the supply inductance.

Looking therefore at the second row of Table 1, it will be seen that the instruction sequence originally presented in the first line of Table 1 contravenes the above constraint, in that there are indeed changes in current consumption of more than 1 unit between successive blocks of 4 instructions. For example, the increase in power consumption between the first block, block A, and the second block, block B, is two units, while there is a decrease in consumption of three units from the third block, block C, to the fourth block, block D.

In order to eliminate such significant changes, monitor 330 modifies the instruction sequence by inserting dummy instructions, as described above in relation to FIG. 3. The power consumption of the resulting modified instruction sequence is shown in the third row of Table 1. Note that the underlined values are the power consumption values for the dummy instructions that have been inserted into the instruction sequence by monitor 330.

The fourth row of Table 1 shows the aggregated power consumption for each block of four instructions after the dummy instructions have been inserted into the instruction sequence. It will be seen that compared to the second row of Table 1, the variation in power consumption from one block to the next is considerably smoothed out for the modified sequence. In particular, the power consumption within any given block of four instructions now differs by only one unit from the power consumption of the immediately adjacent blocks. Consequently, the power drawn through the supply inductance can be maintained at a reasonably constant level over intermediate timescales, thereby helping to prevent any troublesome voltage excursions. This in turn means that some of the design constraints upon the processor may be relaxed, given that variations in power consumption can now be safely accommodated. For example, developers no longer need to test for (or to prohibit) instruction sequences that can lead to rapidly rising or falling power consumption.

TABLE 1

| 0 | 1 | 0 | 0 | 1 | 1 | 1 | 0 | 1 | 1 | 1 | 1 | 0 | 1 | 0 | 0 | 0 | 0 | 0 | 0 |   |   |   |   |
|---|---|---|---|---|---|---|---|---|---|---|---|---|---|---|---|---|---|---|---|---|---|---|---|
| A-1 | | | | B-3 | | | | C-4 | | | | D-1 | | | | E-1 | | | | | | | |

| 0 | 1 | 0 | 0 | 1 | 1 | 0 | 0 | 1 | 0 | 1 | 1 | 1 | 1 | 0 | 1 | 0 | 0 | 1 | 1 | 0 | 0 | 0 | 1 | 0 |
|---|---|---|---|---|---|---|---|---|---|---|---|---|---|---|---|---|---|---|---|---|---|---|---|---|
| A-1 | | | | B-2 | | | | C-3 | | | | D-3 | | | | E-2 | | | | F-1 | | | | |

Similarly, the power supply network and/or any additional components attached to that network no longer need such a high level of protection against fluctuations on the power supply network. For example, it may be possible to reduce the size of capacitor C2 (see FIG. 2), and likewise efforts to minimise stray inductance L2 (again see FIG. 2) in the supply network may also be potentially relaxed. Thus overall there is the possibility of using less robust (and so cheaper) components, thereby leading to cost savings.

It will be appreciated that the above advantages do come at the expense of slightly slower processing. Thus it will be noted that the modified instruction sequence in the third line of Table 1 is somewhat longer than the original instruction sequence (in the first line of Table 1), due of course to the insertion of the dummy instructions into the instruction sequence. Given that in terms of instruction processing, the dummy instructions are just placeholders, with no logical effect, the net result is that it has taken slightly longer to arrive at the same overall processing result. In other words, there is a slight decrease in processing speed.

However, the system is generally designed so that monitor 330 only needs to insert dummy instructions on relatively rare occasions. Thus the processor and power supply network should be able to accommodate current variations arising from the majority of instruction sequences, and so usually the normal or unmodified instruction sequence is executed. It is only when there is some particularly troublesome instruction sequence which would cause an unusually high level of voltage fluctuation that the dummy instructions are inserted. Consequently, it is relatively rare for the instruction sequence to be lengthened by the insertion of dummy instructions. Hence the overall effect on processing efficiency is relatively insignificant.

It is also noted that the most common cause of a sudden fall in power consumption is where the processor starts idling (rather than having some rare instruction sequence that draws unusually low power). It will be appreciated that inserting dummy instructions (D1) at this point does not have any impact on processing throughput, since the processor is idling anyway.

Figure 4:
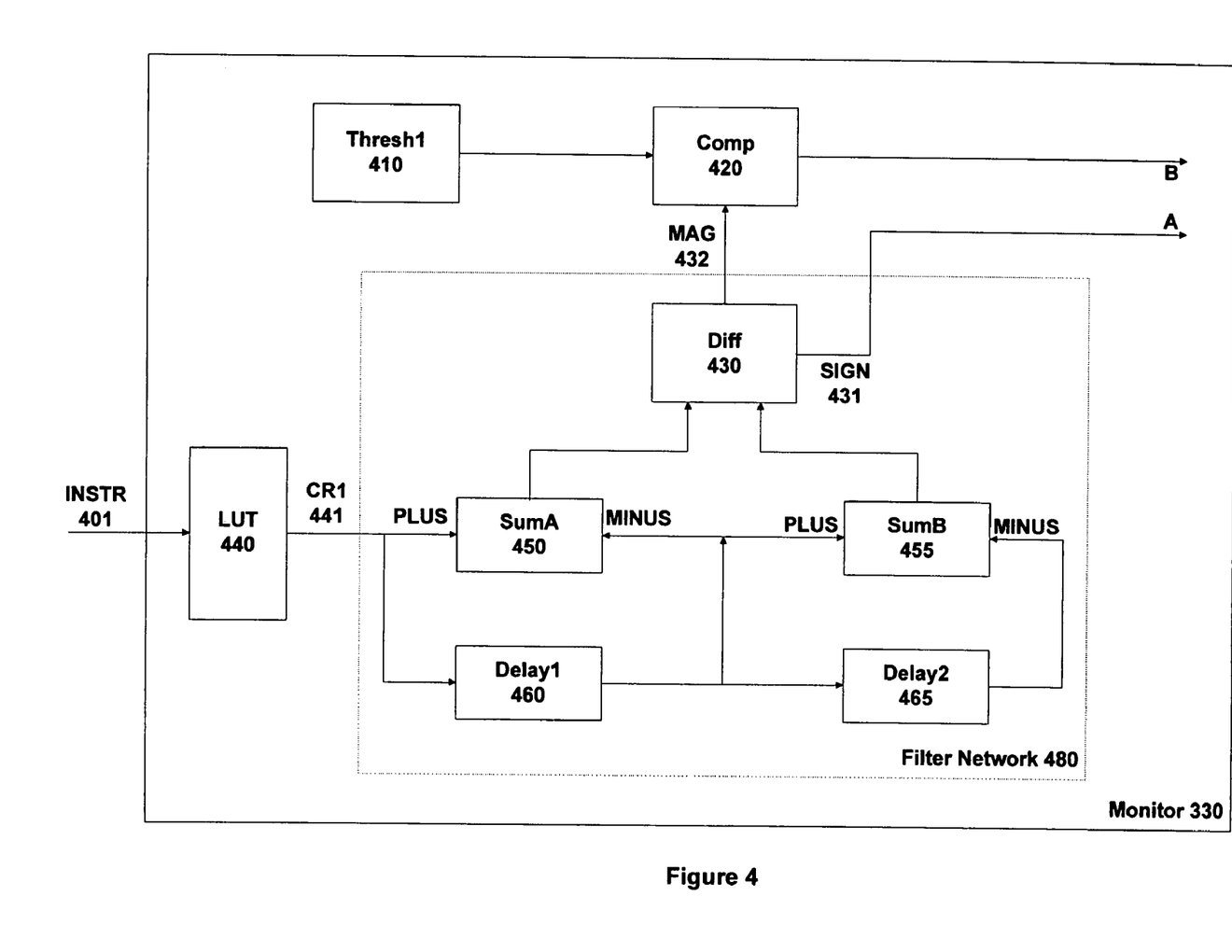
FIG. 4 is a block diagram showing in more detail the power monitoring facility of FIG. 3 in accordance with one embodiment of the invention.

FIG. 4 illustrates one potential implementation of monitor 330. In this implementation, instructions 401 from an instruction queue are received into a lookup table (LUT) 440, which converts them into corresponding power or current consumption values CR1 441. In other words, LUT 440 is used to determine the amount of power or current that is taken by the processor 210 for each processing instruction. The output of LUT 440 (i.e. CR1 441) therefore corresponds to the first line of Table 1. Note however that the values CR1 441 do not necessarily have to be binary (0 or 1); rather, LUT could supply a range of intermediate values if appropriate. For example, CR1 441 may be provided as a four-bit value, with 0 corresponding to no power consumption for the relevant instruction, and 15 (i.e. 1111) representing the maximum possible power consumption for an instruction.

The set of consumption values CR1 441 are then passed into a filter network 480, which in mathematical terms calculates the following:

$$y_i = \left( \sum_{j=i-N}^{i-1} x_j \right) - \left( \sum_{j=i-2N}^{i-(N+1)} x_j \right) \quad \text{(Eq. 1)}$$

where $x_j$ represents the sequence of current consumption values CR 441 resulting from the input instruction sequence. More particularly, the first term in parentheses is determined by the pairing of a first delay unit 460 and a first summation unit 450. The former can be readily implemented by an N-stage shift register, where N again corresponds to the number of processor cycles over which current fluctuations are to be smoothed. The latter, namely summation unit 450, has two inputs, denoted PLUS and MINUS. The values on these inputs are respectively added to and subtracted from the current value stored in summation unit 450.

The second term in parentheses in Equation 1 is then determined by another pairing of a second summation unit 455 and a second delay unit 465. The design and operation of this second pairing are the same as for the first summation unit 450 and the first delay unit 460.

The outputs of the first and second summation units 450 and 455 are fed to a difference calculator 430, which in effect determines the value of $y_i$ from Equation 1 above. The difference calculator 430 outputs two signals, the first representing the magnitude (MAG 432) of the calculated difference, while the second is a binary signal representing the sign (SIGN 431) of the calculated difference. In one embodiment, if the magnitude is zero, then SIGN 431 indicates a positive value, although as will become apparent below, in this situation the value of SIGN 431 is not in fact significant. Note that the SIGN 431 signal corresponds to output A from monitor 330, as depicted in FIG. 3.

The initial operation of filter network 480, which is a form of finite impulse response (FIR) filter, is to low pass filter the input sequence CR1 441. This removes the high frequency current variations on a timescale shorter than N processor cycles, since these can be absorbed by a protective capacitor (C2 in FIG. 2). Thus each pairing of a summation unit and a delay unit calculates a value proportional to the moving average of the input sequence CR1 441. The moving average of the first pairing (summation unit 450 and delay unit 460) is formed from the immediately preceding N instructions, and the moving average of the second pairing (summation unit 455 and delay unit 465) is formed from the N previous instructions. More particularly, summation units 450 and 455 determine the total current usage of a current block of N instructions and of a previous block of N instructions respectively. The difference unit 430 then determines the change in total current usage between these two successive blocks.

Difference calculator 430 outputs magnitude signal MAG 432 to a comparator 420, which compares MAG 432 to a threshold (THRESH1) that is stored in a register 410 or other suitable memory device. Comparator 420 then outputs a binary signal B (corresponding to that depicted in FIG. 3), which is asserted when MAG 432 exceeds THRESH1, but is null otherwise.

For most of the time, it expected that the value of MAG 432 is below the value of THRESH1, and so the value of signal B is null. This indicates that the variation in current consumption between the current block (i.e. for the N immediately preceding instructions) and the previous block (i.e. for the N earlier instructions) is sufficiently low that the system should be able to tolerate any voltage excursion across the supply inductance. Accordingly, with reference to FIG. 3, control signal B sets multiplexer 315 so that the normal instruction sequence from instruction queue 310 is passed, and no dummy instructions are inserted.

However, if the difference in current consumption between the current and previous blocks of instructions is too great, then MAG 432 will exceed THRESH1. In this case, the output of the comparator 420 changes, and output B is now asserted. Consequently, multiplexer of 315 is set so that rather than passing instructions from instruction queue 310, instead a dummy instruction is passed from multiplexer 325. At this stage the value of SIGN 431 becomes important, in that if difference calculator 430 detects a negative difference, indicating a fall in power consumption from the previous block to the current block, SIGN 431 is set to control multiplexer 325 to pass dummy instruction D1. This is a dummy instruction that consumes a relatively large amount of power, and so helps to mitigate the fall in power consumption of the normal instruction sequence. Conversely, if the difference calculator 430 detects a positive difference, representing a rise in power consumption from the previous block to the present block, SIGN 431 is set to control multiplexer 325 to pass dummy instruction D0. This dummy instruction consumes relatively little power, and so offsets the rise in power consumption of the normal instruction sequence.

It will be appreciated that the circuitry of FIG. 4 provides one embodiment for the monitor 330 shown in FIG. 3, and that the overall operations are then generally analogous to those described above in relation to Table 1. In particular, dummy instructions are inserted in order to smooth out what would otherwise be a significant rise or drop in power consumption. (There is a slight difference in that Table 1 uses fixed blocks, whereas the embodiment of FIG. 4 uses sliding blocks, but either approach may be employed if desired).

Figure 5:
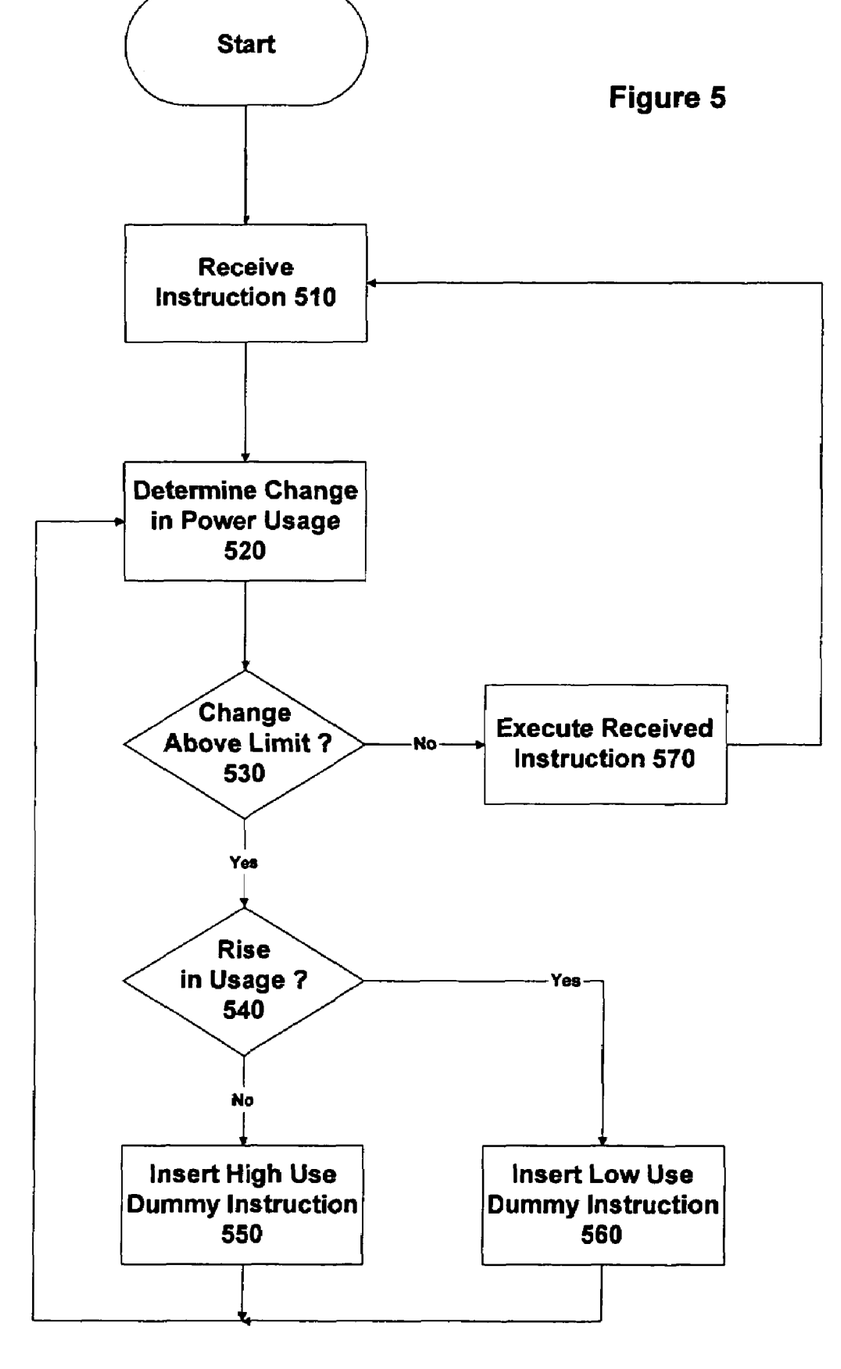
FIG. 5 is a flowchart depicting the operation of the power monitoring facility of FIGS. 3 and 4 in accordance with one embodiment of the invention.

These operations are illustrated in the flowchart of FIG. 5, which commences with receipt of the next instruction to be executed (step 510). A determination is now made of the change in power consumption between a current block of instructions and the preceding block of instructions (step 520). Next, it is tested whether this change is so large that it may lead to an unacceptable voltage excursion within the system (step 530). If this is not the case, the received instruction can be safely executed (step 570), thereby allowing processing to return to the top of the flowchart to receive the next instruction (step 510).

On the other hand, if there has been a significant change in power consumption, the method proceeds to determine whether this change is a fall or a rise (step 540). In the former case, a dummy instruction taking high power is inserted into the instruction stream (step 550), while in the latter case, a dummy instruction taking low power is inserted into the instruction stream (step 560). Processing then returns to step 520, with the loop to insert dummy instructions being repeated until it is determined that the change in power consumption has now been reduced to an acceptably low level. At this point, the instruction originally received at step 510 can now be executed (step 570), and the next instruction for processing obtained.

Returning to FIG. 4, it will be appreciated that the circuitry depicted therein will generally be supplemented by appropriate logic to handle the situation where a dummy instruction is in fact inserted into the instruction stream. Thus in this case the originally presented instruction 401 is postponed, and so must be buffered in order for it to be re-presented to monitor 330 when the power variation has subsided. Such buffering can be performed within the monitor 330 itself, within instruction queue 310 (see FIG. 3), or in any other suitable device.

Furthermore, if a dummy instruction has been inserted into the instruction stream in place of the postponed instruction, the contents of summation unit 450 and delay unit 460 must be updated in order to reflect this fact. The skilled person will be aware of a variety of mechanisms for achieving this. One possibility is to overwrite the power consumption value for the postponed instruction in delay unit 460 with that for the relevant dummy instruction. In addition, the power consumption value for the postponed instruction value can be subtracted out of summation unit 450, and that for the relevant dummy instruction added back in.

Another possibility is to provide the pairing of summation unit 450 and delay unit 460 in triplicate. The first pairing then represents that shown in FIG. 4, and receives the power consumption value for the normal instruction 401. In contrast, the second and third pairings receive and are updated with the power consumption value for the dummy instructions D0 and D1 respectively. After each instruction cycle, if no dummy instruction is inserted (i.e. if output B is not asserted), the second and third pairings are updated with the contents from the first pairing. However, if a dummy instruction is inserted (and so output B is asserted), a determination is made as to which dummy instruction (D0 or D1) has in fact been inserted. This is indicated by the value of SIGN 431 (corresponding to output A). If D0 has been inserted, then the first and third pairings are updated with the contents from the second pairing, while if D1 has been inserted, then the first and second pairings are updated with the contents from the third pairing. In this manner, all three pairings can be made to accurately reflect the current state of the instruction stream, and so ensure proper operation of the monitor 330.

It will be appreciated that there are many potential variations on the embodiments illustrated in FIGS. 3 and 4. For example, multiplexers 315 and 325 could be replaced by any other suitable device(s) for inserting dummy instructions as appropriate into the instruction stream. In addition, monitor 330 need not be located on CPU 210 itself, but could instead be present on some associated device (e.g. a co-processor).

Furthermore, while filter network 480 represents one possible mechanism for detecting variations in power consumption on a particular timescale, the skilled person will be aware of many other circuits for implementing appropriate functionality. For example, in one embodiment filter network 480 models the power supply network, and in particular the behaviour of voltage $V_3$ as a result of the current consumption of each individual instruction (this is dependent upon circuit elements L2, C2, and so on). The predicted value of $V_3$ is compared against specifications (i.e. the minimum and maximum limit values of $V_3$ that can be properly accommodated by the components in the system). Dummy instructions are then inserted as appropriate to prevent or counter any excursion of $V_3$ outside these specifications. It will be appreciated that modelling the power supply network in this manner provides a more rigorous approach than the generalised filtering of Equation 1 above.

Note that in this embodiment, it is the supply voltage level itself that is calculated, rather than an estimated level of power consumption (although the two are of course directly related). It will be appreciated therefore that with regard to step 520 in FIG. 5 (determining a change in power usage), this may be accomplished by using the power level itself, or any parameter that is suitably related to it (such as current, voltage level, etc.)

Figure 6:
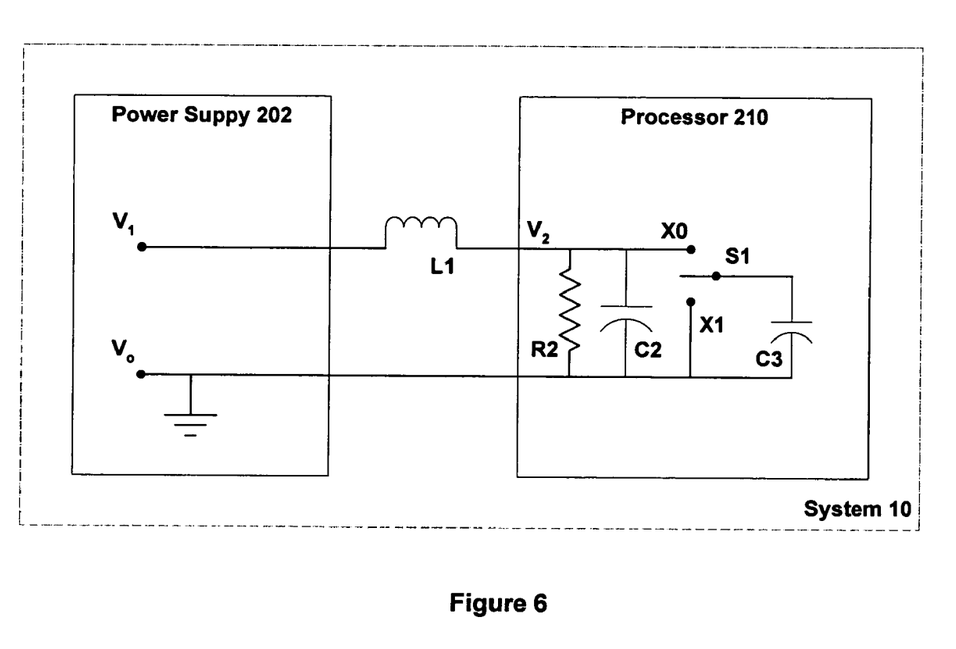
FIG. 6 is schematic representation showing another configuration for the power supply to a processor in a typical computer system.

An example of a model of a power supply network has been developed for the circuit shown in FIG. 6, which is a variant of the circuit shown in FIG. 2. In FIG. 6, it is assumed that a power supply 202 of voltage $V_1$ supplies power to a processor 210 via circuit inductance L1 and decoupling capacitor C2. The input voltage to the processor is denoted as $V_2$. Each active operation of the processor 210 is assumed to charge up capacitor C3 and then to discharge it to ground (i.e. to connect switch S1 first to X0 and then to X1). If the processor is inactive, then the switch S1 remains in the open position, as illustrated in FIG. 6. The time interval between processor cycles is denoted as T. The processor 210 is assumed to present a DC load of R2.

In the model, a dummy instruction (D1) is inserted if the voltage rises above a predetermined maximum. The inserted instruction causes the processor to draw current, which tends to decrease the voltage. Conversely, if the voltage falls below a predetermined minimum, an instruction is inhibited. The lack of instruction to be executed prevents the processor from drawing any current, and tends to increase the voltage. (Note that inhibiting an instruction can be regarded as analogous to inserting a void dummy instruction, D0).

The model incorporates seven logical (Boolean) parameters as set out in Table 2 below. It is assumed that B1 (Enable), which determines whether or not voltage regulation is applied, is set once at the beginning of the run. A sequence of values for B2 is provided (corresponding to the instruction sequence). This then allows corresponding values of parameters B3, B4, B5, B6 and B7 to be calculated for each processor cycle, as set out in Table 2.

TABLE 2

| Symbol | Name | Function | Derivation |
|---|---|---|---|
| B1 | Enable | Indicates whether or not voltage limiting circuit is in operation | From User Setting |
| B2 | Want | Indicates whether instruction sequence wants an operation to occur | From Instruction Sequence |

TABLE 2-continued

| Symbol | Name | Function | Derivation |
|---|---|---|---|
| B3 | Inhibit | Indicates whether an instruction should be prohibited to avoid voltage drop | If $V_2 < V_{min}$, B3=1; else B3=0 |
| B4 | Augment | Indicates whether an instruction should be inserted to avoid voltage rise | If $V_2 > V_{max}$, B4=1; else B4=0 |
| B5 | QueueAug | Indicates an inhibited instruction is to be queued | If B2=B3=1, B5=1; else B5=0 |
| B6 | QueueDec | Indicates a queued instruction is to be processed | If B2=B3=0 AND QUEUE>0, B6=1; else B6=0 |
| B7 | Active | Indicates whether an instruction is to be processed | If B1=0, B7=B2; If B1=1: If B4=1 OR B6=1 OR (B3=0 AND B2=1), B7=1; else B7=0 |

In the model, we can image all instructions being received into a FIFO queue. The variable QUEUE is then used to hold the number of instructions in this queue. The value of QUEUE is initially set to zero, and the queue remains empty unless (until) there are inhibited instructions. The value of QUEUE is then modified in accordance with the values of B5 and B6 from the previous processor cycle—i.e. QUEUE is increased by one if B5=1, and decreased by one if B6=1. (Note that the definition of the model is such that only one of B5 or B6 is ever set per cycle. Accordingly, if an instruction arrives and an instruction is also processed, so that both B2 and B7 equal 1, then B5 and B6 are both set to zero, and the queue length is unchanged).

The model further defines various physical parameters, as set out in Table 3 below:

TABLE 3

| Parameter | Explanation | Initial Setting (N = 1) | Derivation |
|---|---|---|---|
| V2(N) | The voltage into the processor (as shown in FIG. 2) | 1.0 (as V1) | V2(N − 1) + dV2(N − 1) |
| dV2(N) | The change in voltage V2 | — | Q2(N)/C2 |
| Q2(N) | The charge flowing onto capacitor C2 per cycle | — | Q1(N) − Q3(N) − QR(N) |
| Q1(N) | The charge flowing into the processor per cycle | — | I1(N) * T |
| I1(N) | The current into the processor (through inductor L1) | V1/R2 | I1(N − 1) + dI1(N − 1) |
| dI1(N) | The change in current I1 | — | (V1 − V2(N)) * (T/L1) |
| Q3(N) | The charge consumed (via C3) by an active processor instruction | — | C3 * V2(N) * B7(N) |
| QR(N) | The charge flowing through resistor R2 per cycle | — | V2(N) * T/R2 |

The variable N in Table 3 counts cycles. It is assumed in Table 3 that the processor is initially (at N=1) in an off state, whereby $V_2=V_1$, and $I1=V_1/R_2$. The system remains in this steady state for as long as B27 (as defined in Table 2) stays at zero—i.e. there are no active instructions in processor 210.

As an example of the power regulation of the model of Tables 2 and 3, the following values were adopted for the various parameters in the model (all in the appropriate SI units):

| | |
|---|---|
| $V_1 =$ | 1.0 |
| $V_{min} =$ | 1.02 |
| $V_{max} =$ | 0.97 |
| L1 = | $5 \times 10^{-9}$ |
| C2 = | $5 \times 10^{-9}$ |
| R2 = | 1.0 |
| T = | $3 \times 10^{-10}$ |
| C3 = | $5 \times 10^{-11}$ |

A sample input instruction sequence, corresponding to the WANT variable, was provided, comprising 7 zeros, followed by 112 ones, followed by 206 zeros (where one indicates in effect the presence of an instruction, and a zero indicates the absence of an instruction). The outcome of this processing is shown in the graphs of FIGS. 7 and 8, both of which are plotted with instruction (cycle) number as the abscissa.

Figure 7:
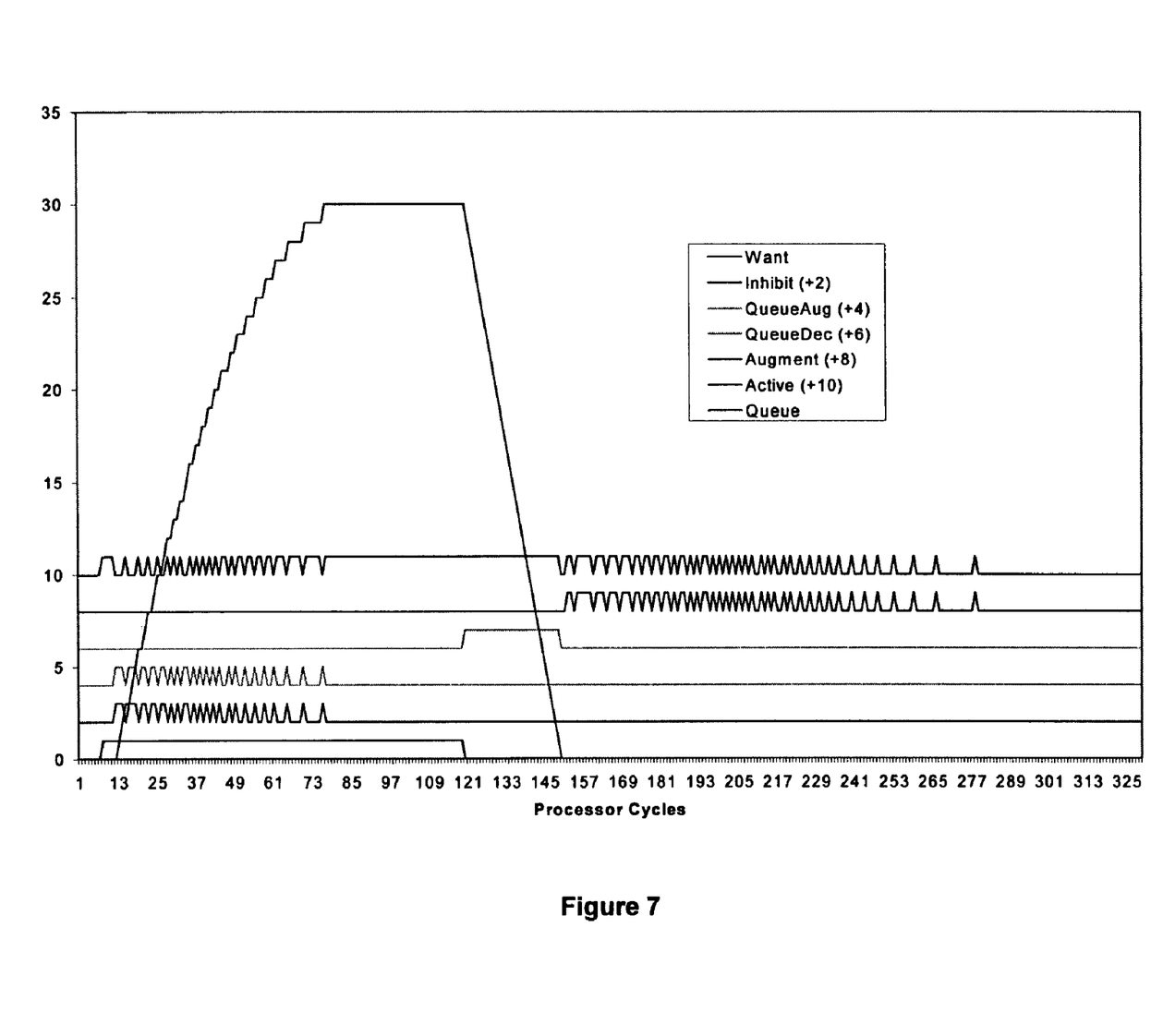
FIGS. 7 and 8 are graphs illustrating the effect of the voltage regulation described herein.

FIG. 7 plots the six Boolean variables of Table 2, apart from B1, which was set at one throughout this plot (i.e. voltage regulation was switched on). For clarity, each of the Boolean variables has been supplemented by a (different) fixed offset, in order to space the variables out along the ordinate. FIG. 7 also depicts the value of the QUEUE variable, representing the number of instructions that have been inhibited and as a result are pending in the queue.

Figure 8:
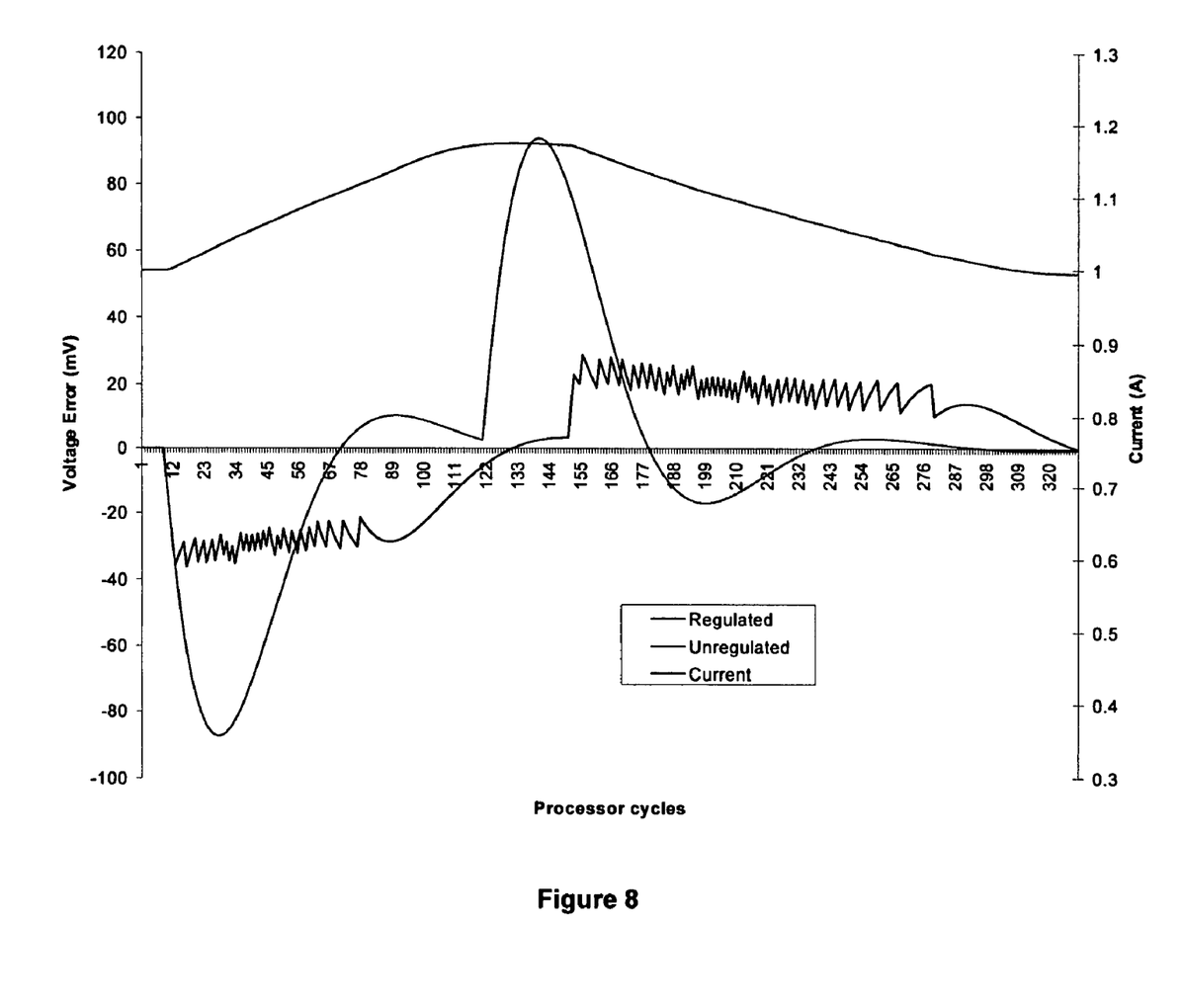

FIG. 8 provides a comparison of the voltage error (i.e. $V_1-V_2$) with and without the voltage regulation described herein. More particularly, with voltage regulation corresponds to B=1, while without voltage regulation corresponds to B1=0. FIG. 8 also depicts the current ($I_1$) flowing into the processor when voltage regulation is enabled (scaled according to the right-hand ordinate).

It can be seen from FIG. 7 that the Active line initially follows the Want line, whereby instructions are processed as received. However, after a few instructions have been processed, the voltage ($V_2$) starts to fall quite rapidly (see FIG. 8). At this point, the inhibit Signal cuts in to prevent execution of any further instructions. These inhibited instructions are added to the queue instead, which therefore starts to grow. Consequently, the behaviour of the QueueAug variable mirrors that of the Inhibit variable, while both of these are opposite to the Active variable (since if an instruction is being queued it is not being processed).

Inhibiting an instruction allows the voltage to recover enough to enable the next instruction to be processed. However, the processor voltage again falls below the $V_{min}$ threshold as one or more subsequent instructions are processed, causing the inhibit variable to be triggered once more. This cycling of the inhibit variable is rapid at first, but slows as the current ($I_1$) into the processor gradually rises (see FIG. 8). This increased current allows more instructions to be processed before the voltage starts to drop below the $V_{min}$ threshold. Accordingly, the inhibit instructions are inserted less frequently, until eventually the current supplied is sufficient for the processor to handle a continuous sequence of instructions. At this point, which corresponds approximately to processor cycle 78 in FIGS. 7 and 8, the processor executes incoming instructions as per normal.

Subsequently, the instruction sequence to be executed is exhausted, as indicated by the Want variable returning to zero. This then allows the queued (inhibited) instructions to be processed (preserving of course the original instruction ordering). This causes the QueueDec variable to become one. (It will be appreciated that these transitions in the Want and QueueDec variables are transparent to the processor, which simply sees a continuous input of instructions to be executed).

After the queue has been emptied, there are no more instructions to process. The resultant sudden reduction in load leads to the processor voltage $V_2$ rising above the $V_{max}$ threshold. Accordingly, dummy instructions are periodically inserted, as indicated by the Augment variable, in order to ensure that the processor maintains some load on the power supply. As a dummy instruction executes, the voltage $V_2$ falls. This permits at least one idle cycle before the voltage starts to rise again, and another dummy instruction must be inserted.

The Augment variable now cycles on and off (analogous to the Inhibit variable previously) as the processor voltage repeatedly rises above $V_2$ and then recovers. However, allowing the processor to idle for at least some instructions causes the input current ($I_1$) to fall gradually (see FIG. 8), which reduces the voltage build-up if no instruction is being executed. This then allows more idle instructions to be performed before having to insert a dummy instruction. Eventually, the current is low enough that no more dummy instructions needs to be inserted, and the system returns to its initial steady state condition, with $V_2$ matching $V_1$.

Looking at FIG. 8, it can be seen that without regulation, the voltage dips rapidly at the start of an instruction sequence before returning back to zero, and then rises sharply at the end of an instruction sequence. In contrast, the provision of the voltage regulation significantly reduces these voltage swings, and so can help to ensure that the power supply to the processor and other components stays within specification.

Although FIG. 8 shows that the regulated voltage supply is much smoother than the unregulated voltage supply on a large-scale, there are nevertheless some rapid small-scale oscillations on the regulated voltage supply, as the Augment and Inhibit bits switch on and off. This is not normally expected to be a problem for the operation of the system, but in any event, various techniques are available if required to reduce such small-scale oscillations. For example, one possibility would be to have dummy instructions that consume only less power than a conventional instruction (i.e. where C3 would only be partly charged up). These reduced-power dummy instructions could then be inserted as appropriate, either upon an Inhibit or an Augment trigger. In addition, if a voltage threshold is breached, more than one instruction might be inserted or inhibited. Techniques such as these could typically be used to reduce the oscillations of FIG. 8 for the regulated voltage supply.

It will be noted that in the model just described, the minimum voltage (0.97) has a greater offset from the nominal voltage (1.0) than does the maximum voltage (1.02). This is in contrast to the embodiment of FIG. 4, which uses a symmetrical threshold for determining an unacceptable rise or fall in power consumption (since difference unit 430 outputs an unsigned value MAG 432 for comparison with threshold 410).

As previously stated, the most likely cause of a sudden fall in power consumption is due to the processor starting idling. In this situation, the insertion of dummy instructions has no impact on overall processing, since the dummy instructions are not replacing any useful instructions. In contrast, if there is a sudden rise in power consumption, then any dummy instructions inserted will generally delay execution of program instructions.

This asymmetry can be exploited by providing an off-centre nominal voltage, as in the above model. For example, let us assume that $V_2$ (as shown in FIG. 6) remains in specification for the system providing it is between $V_{min}$ and $V_{max}$. If $V_2$ is likely to rise above $V_{max}$, this is typically due to the processor going into idle mode, in which case there is no performance penalty for inserting dummy instructions (D1). On the other hand, if $V_2$ is likely to fall below $V_{min}$, then the inserted void dummy instructions (D0) (i.e. inhibiting instructions) will indeed lead to some delay in program execution. It can therefore be advantageous to set the nominal value of $V_2$ closer to $V_{max}$ than to $V_{min}$. (The nominal value of $V_2$ is its value when the CPU is taking a constant power consumption and the power supply network has reached a steady state; it can be adjusted by providing appropriate circuit elements in the power supply network, or by arranging $V_1$ accordingly).

Having an off-centre nominal voltage for $V_2$ therefore provides greater margin to accommodate for voltage falls (due to increased power consumption) than to accommodate voltage rises (due to decreased power consumption). Consequently, it is expected that the voltage is more likely to go out of range in the latter situation than the former, in other words, insertion of dummy instruction D1 is more likely to be required than insertion of dummy instruction D0. However, as explained above, dummy instruction D1 is typically invoked during processor idle time, without any performance penalty. Thus the bias in favour of inserting D1 rather than D0 will result in a net decrease in overall processing delay, compared to the centralised nominal voltage shown in the embodiment of FIG. 4. (It will be appreciated that the embodiment of FIG. 4 can be altered to accommodate such an offset margin, for example by providing two separate thresholds, and selecting between them in accordance with the value of SIGN 431).

A further possible area of modification or adaptation is LUT 440 (see FIG. 4 again), which determines the power consumption value (CR 441) for any given input instruction. This may be altered according to the particular mapping to be performed. For example, as previously suggested, the power consumption for a given instruction may be dependent upon the state of the processor, which in turn typically reflects past processing. One way to accommodate this is to make LUT 440 M-dimensional, and then perform the lookup on the basis of the previous M instructions. This therefore allows the power consumption estimate to reflect the history of the previous M instructions that have been processed. An alternative approach is to develop some form of state model for the processor 210. The input to this model is then the next instruction to be processed. This input causes the state of the model to transition accordingly, and also produces an output indicative of the power consumption associated with executing that instruction (for the particular state concerned).

In conclusion, although the approach described herein is typically intended for use in a computer system, it is applicable to any electronic system that has a power supply and one or more semiconductor digital electronic load devices for processing instructions, such as a microprocessor, a DSP, a controller, an application specific integrated circuit (ASIC), and so on. It will be appreciated that this includes not only a wide variety of computing systems (mainframe, server, workstation, desktop, laptop, handheld, etc.), but also a great range of other electronic systems (e.g. telecommunications apparatus, household electronic devices such as televisions and DVD players, subsystems for transport devices such as cars and aeroplanes, and so on). In addition, the regulation can be employed for a wide range of power supply circuits and configurations (such as shown in FIG. 2, FIG. 6, and variations thereon).

Thus while a variety of particular embodiments have been described in detail herein, it will be appreciated that this is by way of exemplification only. The skilled person will be aware of many further potential modifications and adaptations that fall within the scope of the claimed invention and its equivalents.

The invention claimed is:

1. A method of controlling power consumption in a semiconductor device operable to process a sequence of instructions, the method comprising:
    monitoring the power consumption of the device;
    detecting a significant change in the power consumption of the device, wherein detecting the significant change in the power consumption of the device comprises:
        providing a model of a power supply network for the device, and setting upper and lower limits for a voltage in said power supply network;
        estimating said voltage in said power supply network based on the monitored power consumption of the device; and
        determining whether the estimated voltage is between said upper and lower limits, and if not, regarding this as a significant change in the power consumption of the device; and
    inserting one or more dummy instructions into the sequence of instructions, wherein said one or more dummy instructions are selected in order to smooth the change in the power consumption of the device.

2. The method of claim 1, wherein monitoring the power consumption of the device comprises:
    receiving instructions from said sequence of instructions; and
    estimating the power consumption of the device for each of said instructions.

3. The method of claim 2, wherein estimating the power consumption for each of said instructions comprises accessing a look-up table to find a predicted power consumption for the instructions concerned.

4. The method of claim 2, wherein estimating the power consumption for each of said instructions comprises:
    maintaining a state of the device, wherein the state is updated from a previous state to a new state in accordance with the instruction from the sequence currently being processed; and
    predicting the power consumption based on the previous state and the new state of the device.

5. The method of claim 1, wherein detecting a significant change in the power consumption of the device comprises determining a difference between the power consumption over a current set of N instruction cycles and the power consumption over a preceding set of N instruction cycles, and wherein a significant change is detected if said difference exceeds a predetermined threshold.

6. The method of claim 5, further comprising a smoothing capacitor across a power input to the device, and wherein said threshold corresponds to a change in power consumption representing a charge Q flowing across N instruction cycles, where Q is greater than the charge stored on said smoothing capacitor at an expected operating voltage of the device.

7. The method of claim 5, further comprising an inductance L in series with a power input to the device, and where $N < L.I_{max}/VT$, where V is the expected operating voltage of the device, $I_{max}$ is the maximum expected operating current of the device, and T is the time for one instruction cycle.

8. The method of claim 1, wherein detecting a significant change in the power consumption of the device comprises:
    determining an estimated power consumption as a function of time corresponding to the sequence of instructions to be processed; and
    examining whether fluctuations in the estimated power consumption at an intermediate timescale exceed a predetermined limit.

9. The method of claim 1, wherein said model comprises a filter network representative of at least capacitive and inductive components in the power supply network.

10. The method of claim 1, wherein changes in the power consumption of the device occur on short timescales, intermediate timescales, and long timescales, and detecting a significant change in the power consumption of the device comprises examining changes on intermediate timescales.

11. The method of claim 1, wherein inserting one or more dummy instructions into the sequence of instructions comprises inserting one or more instructions that consume relatively little power if said significant change in the power consumption of the device represents a rise in power consumption, and inserting one or more instructions that consume relatively high power if said significant change in the power consumption of the device represents a fall in power consumption.

12. The method of claim 1, further comprising biasing the device towards inserting dummy instructions that consume relatively high power compared to inserting dummy instructions that consume relatively low power.

13. The method of claim 12, wherein said biasing the device comprises setting a nominal power supply voltage for the device, and setting upper and lower limits for the power supply voltage for the device, and wherein said nominal power supply voltage is closer to said upper limit than to said lower limit.

14. The method of claim 1, further comprising buffering the sequence of instructions if one or more dummy instructions are inserted.

15. Means for controlling power consumption in a semiconductor device operable to process a sequence of instructions, comprising:
    means for monitoring the power consumption of the device;
    means for detecting a significant change in the power consumption of the device;
    means for inserting one or more dummy instructions into the sequence of instructions, wherein said one or more dummy instructions are selected in order to smooth the change in the power consumption of the device; and
    means for biasing the device towards inserting dummy instructions that consume relatively high power compared to inserting dummy instructions that consume relatively low power, wherein said biasing the device comprises setting a nominal power supply voltage for the device, and setting upper and lower limits for the power supply voltage for the device, and wherein said nominal power supply voltage is closer to said upper limit than to said lower limit.

16. A semiconductor device comprising:
    a smoothing capacitor across a power input to the device;
    a queue operable to hold a sequence of instructions;

a monitor operable to estimate power consumption of the device;

a detector operable to flag a significant change in the estimated power consumption of the device representing a charge Q flowing across N instruction cycles, where Q is greater than the charge stored on said smoothing capacitor at an expected operating voltage of the device; and a multiplexer, wherein a first input of the multiplexer is connected to the queue, a second input of the multiplexer is connected to one or more stored dummy instructions, and a control input of the multiplexer is connected to the detector.

17. A semiconductor device operable to process a sequence of instructions, comprising:

a monitor operable to estimate power consumption of the device;

a detector operable to flag a significant change in the estimated power consumption of the device;

a set of one or more dummy instructions for injection into the sequence of instructions in response to a significant change in the estimated power consumption of the device, wherein said one or more dummy instructions are selected in order to smooth the change in the power consumption of the device;

an interface to a power supply network for the device;

a model of the power supply network for use in the detector, wherein said model uses the estimated power consumption of the device to determine a voltage at the interface; and wherein said model is operable to flag the significant change in estimated power consumption of the device if the determined voltage at said interface goes outside a predetermined range.

18. The device of claim 17, wherein the monitor includes a look-up table containing an estimated power consumption for each instructions.

19. The device of claim 17, wherein the monitor is operable to maintain a state of the device, wherein the state is updated from a previous state to a new state in accordance with the instruction from the sequence currently being processed, and to estimate the power consumption of the device based on the previous state and the new state of the device.

20. The device of claim 17, wherein the detector is operable to assess a difference between the power consumption of the device over a current set of N instruction cycles and the power consumption of the device over a preceding set of N instruction cycles, and wherein a significant change is flagged if said difference exceeds a predetermined threshold.

21. The device of claim 17, further comprising a smoothing capacitor across a power input to the device.

22. The device of claim 21, wherein the detector is operable to flag a change in the power consumption of the device representing a charge Q flowing across N instruction cycles, where Q is greater than the charge stored on said smoothing capacitor at an expected operating voltage of the device.

23. The device of claim 17, wherein changes in the power consumption of the device occur on short timescales, intermediate timescales, and long timescales, and the detector is responsive to changes in the power consumption of the device on intermediate timescales.

24. The device of claim 17, wherein said model comprises a filter network representative of at least capacitive and inductive components in the power supply network.

25. The device of claim 17, wherein one or more dummy instructions that consume relatively little power are inserted if said significant change in the power consumption of the device represents a rise in power consumption, and one or more dummy instructions that consume relatively high power are inserted if said significant change in the power consumption of the device represents a fall in power consumptions.

26. The device of claim 25, wherein the device is biased towards inserting dummy instructions that consume relatively high power compared to inserting dummy instructions that consume relatively low power.

27. The device of claim 26, wherein a power supply voltage for the device has a nominal value, and upper and lower limits are defined for the power supply voltage to remain within specifications, and wherein said nominal value is set closer to said upper limit than to said lower limit.

28. Apparatus, including:

a power supply unit;

a semiconductor device operable to process a sequence of instructions;

a power supply network from the power supply unit to the semiconductor device incorporating at least some inductance;

wherein the semiconductor device is operable to process one or more dummy instructions if the sequence of instructions for processing would otherwise require a significant change in current passing through said inductance;

a model of the power supply network, wherein said model uses an estimated power consumption of the device to determine a voltage in the power supply network; and wherein said device is operable to process said one or more dummy instructions if the determined voltage goes outside a predetermined range.

29. The apparatus of claim 28, wherein the semiconductor device is biased towards inserting dummy instructions that consume relatively high power compared to inserting dummy instructions that consume relatively low power.

30. The apparatus of claim 29, wherein a power supply voltage for the device has a nominal value, and upper and lower limits are defined for the power supply voltage to remain within specifications, and wherein said nominal value is set closer to said upper limit than to said lower limit.

* * * * *